United States Patent [19]

Routhier

[11] Patent Number: 4,487,116
[45] Date of Patent: Dec. 11, 1984

[54] CULINARY APPLIANCE FOR PREPARING SANDWICHES OF THE TYPE KNOWN AS "HAMBURGERS"

[75] Inventor: Dominique Routhier, Annecy, France

[73] Assignee: SEB S.A., Selongey, France

[21] Appl. No.: 496,486

[22] Filed: May 17, 1983

[30] Foreign Application Priority Data

Jan. 7, 1983 [FR] France .................. 83 00182

[51] Int. Cl.³ .............................. A47J 37/06
[52] U.S. Cl. ................................ 99/339; 99/349; 99/401; 99/448; 99/450; 219/475
[58] Field of Search ............... 99/339, 349, 401, 426, 99/447, 448, 450; 426/523; 219/404, 405, 475

[56] References Cited

U.S. PATENT DOCUMENTS

| | | | |
|---|---|---|---|
| 1,179,986 | 4/1916 | Warner | 99/339 X |
| 1,751,219 | 3/1930 | Seamon | 219/475 X |
| 1,878,258 | 9/1932 | Bemis | 99/339 |
| 2,040,479 | 5/1936 | Glore | 99/339 |
| 2,171,510 | 8/1939 | Stirgwolt | 99/339 X |
| 2,632,379 | 3/1953 | Kudo | 99/349 X |
| 3,610,885 | 10/1971 | Zingg | 99/339 |
| 3,669,002 | 6/1972 | Davidson | 99/339 X |
| 3,938,495 | 2/1976 | Bauer | 99/339 X |

FOREIGN PATENT DOCUMENTS 2701502 8/1978 Fed. Rep. of Germany ........ 99/339

Primary Examiner—Billy J. Wilhite
Attorney, Agent, or Firm—Young & Thompson

[57] ABSTRACT

The culinary appliance for preparing "hamburgers" comprises a heating resistor, a hotplate which is mounted above the resistor and on which the portion of meat to be cooked is placed, a pressure member which is applied against the portion of meat and forms a meat-cooking enclosure in conjunction with the hotplate, a bread-heating enclosure for receiving at least one piece of bread, and a base for supporting the heating resistor, the hotplate and the pressure member. The meat-cooking enclosure and the bread-heating enclosure are juxtaposed and heated simultaneously by the resistor, at least one metallic wall being placed between the bread-heating enclosure and the resistor in order to limit the heating temperature within the bread enclosure to the value required for the piece of bread.

11 Claims, 3 Drawing Figures

FIG_1

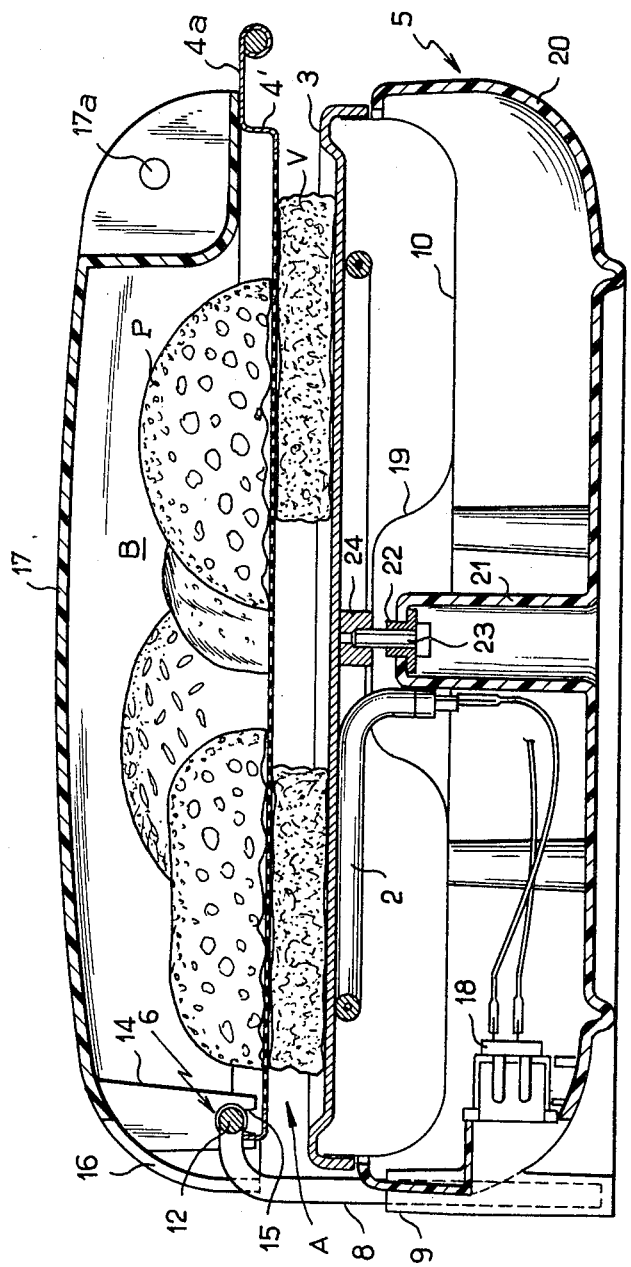
FIG_3

CULINARY APPLIANCE FOR PREPARING SANDWICHES OF THE TYPE KNOWN AS "HAMBURGERS"

This invention relates to an appliance, especially of the household type for preparing constituents of sandwiches, in particular for "hamburgers". It is known that sandwich compositions of this type consist of a layer of meat, especially hashed meat cooked between two slices of bread (or a bread-type food product) which have previously been heated.

The appliance in accordance with the invention which serves to cook the portion of meat and to heat the slices of bread comprises a heating resistor, a cooking plate or so-called hotplate placed above said resistor and intended to receive at least one portion of meat to be cooked. The appliance further comprises a pressure member which is intended to be applied against the portion of meat placed on the hotplate and which determines with said hotplate a first heating enclosure in which said portion of meat is located, a second heating enclosure for receiving at least one piece of bread to be heated, and a base for supporting the heating resistor, the hotplate and the pressure member.

Appliances of the type mentioned above are already known in which the first and the second heating enclosure are located next to each other, with the result that the appliance occupies a substantial area. Furthermore, the pressure member, which is not connected to the base, is provided with a handle for gripping said member and applying it against the portion of meat to be cooked. After cooking, the pressure member has to be removed and laid next to the appliance or on a special surface provided on said appliance. In either case, the surface area required for carrying out operations involving the preparation of a sandwich of the type considered is increased even further. Moreover, in these known appliances, the second enclosure is formed by a bell-housing placed on a hotplate on which the pieces of bread are placed. Said bell-housing must also be removed and laid next to the appliance when withdrawing the pieces of bread if the user desires to have both hands free. This further increases the area of the work surface which is necessary for the preparation of a "hamburger".

The aim of the invention is to produce a culinary appliance of the type mentioned in the foregoing but having the advantage of small overall size and simplification of the handling operations involved in the preparation of one or a number of sandwiches of the "hamburger" type.

In accordance with the invention, said culinary appliance is distinguished by the fact that the first and second heating enclosures are juxtaposed and heated simultaneously by said heating resistor. At least one metallic wall is placed between the second heating enclosure and the resistor in order to limit the heating temperature within the second enclosure to the value required for the piece or pieces of bread.

The advantages of a culinary appliance in accordance with this design will be readily apparent from the brief summary given below.

On the one hand, the fact that the first and the second heating enclosures are juxtaposed results in an appliance of smaller overall size in respect of performances equal to those of known appliances. The fact that the two heating enclosures are heated by the same resistor makes it possible to simplify the construction of the appliance and to reduce its power consumption.

Moreover, the presence of a metallic wall between the second heating enclosure and the heating resistor (placed beneath the hotplate) makes it possible to attenuate and to distribute the heat flux received by the second enclosure from the resistor which is designed to produce a heat output and a temperature of sufficiently high value to cook the meat. Thus the pieces of meat and of bread are heated simultaneously at their optimum temperatures.

In an advantageous version of the invention, the pressure member is a lid which has a flat surface and can be connected to the base by means of a hinge joint. Thus the pressure member can be handled in the same manner as a lid mounted on a hinge and can remain continuously in the most suitable position on the appliance which has a smaller surface area.

In an advantageous embodiment of the invention, the connection between the pressure member and the base comprises, in addition to the hinge, a sliding joint for modifying the distance between the pressure member and the hotplate and for adapting the height of the first enclosure to the thickness of the portion of meat.

The appliance constitutes in this case a compact assembly in which all the elements are interconnected while permitting the best possible adaptation to each particular case encountered.

A number of alternative embodiments are possible in regard to the superposition of the first and second heating enclosures.

In a preferred form of construction, the second heating enclosure is located beneath the first heating enclosure, the top face of the base being intended to delimit the bottom surface of the second heating enclosure.

The cooking plate or so-called hotplate of an appliance of this type can be of relatively substantial thickness with a built-in heating resistor. However, the resistor should preferably be of the sheathed type and located in the immediate vicinity of the underface of the hotplate. Said intermediate metallic wall should preferably be a sheet-metal member placed beneath the resistor in order to constitute on the one hand a thermal reflector for returning part of the radiation produced by the resistor to the hotplate and, on the other hand, a heat source having low radiation density for transmitting to the second enclosure and distributing within this latter the energy which has not been reflected towards the hotplate.

With the characteristics outlined in the foregoing, the appliance is of lightweight construction and easy to manufacture. Furthermore, heating of bread takes place without burning of the crumb portion of the bread and without any need to provide different residence times for the meat and for the portions of bread.

In a preferred form of construction, the pressure member is constituted by the underface of a compartment-type lid pivotally mounted on at least one hinge-pin formed on at least one column which is slidably mounted in the base.

The form of construction thus obtained has an attractive appearance while at the same time providing a simple design for the hinge joint and the sliding connection.

In another preferred embodiment, the second heating enclosure in which the bread is heated is located above the first heating enclosure in which the meat is placed.

In this case, the appliance has the following characteristics :

the heating resistor is located beneath and in close proximity to the hotplate ;

there are two intermediate metallic walls between the heating resistor and the second heating enclosure ;

the second heating enclosure is located above the first heating enclosure, and the two intermediate metallic walls are constituted in one case by the hotplate and in the other case by a grid or a perforated sheet-metal member which constitutes both the pressure member and the bottom wall of the second heating enclosure;

the top wall of the second heating enclosure is a cover pivotally mounted on at least one hinge-pin formed on at least one column which is slidably mounted on or in the base, the pressure member being pivotally mounted on said hinge-pin.

By means of this alternative embodiment, the cover can also be coupled to the base by means of a hinge-type connection.

Other features of the invention will be more apparent upon consideration of the following description and accompanying drawings, wherein:

FIG. 3 is a longitudinal sectional view in elevation showing a second embodiment of an appliance according to the invention, in which the second heating enclosure is located above the first enclosure.

Figure 1:
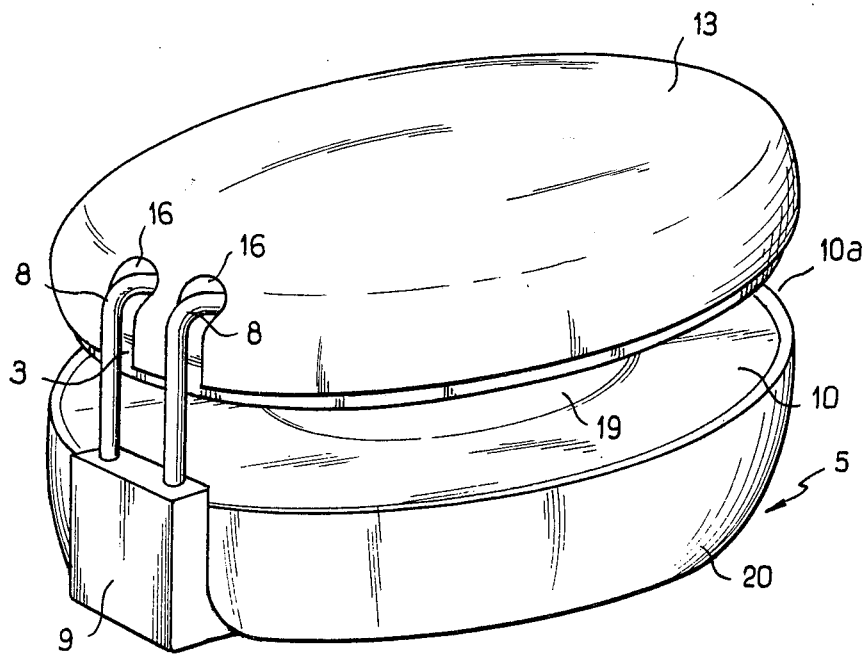
FIG. 1 is a general view in perspective showing a first embodiment of the appliance according to the invention.
Figure 2:
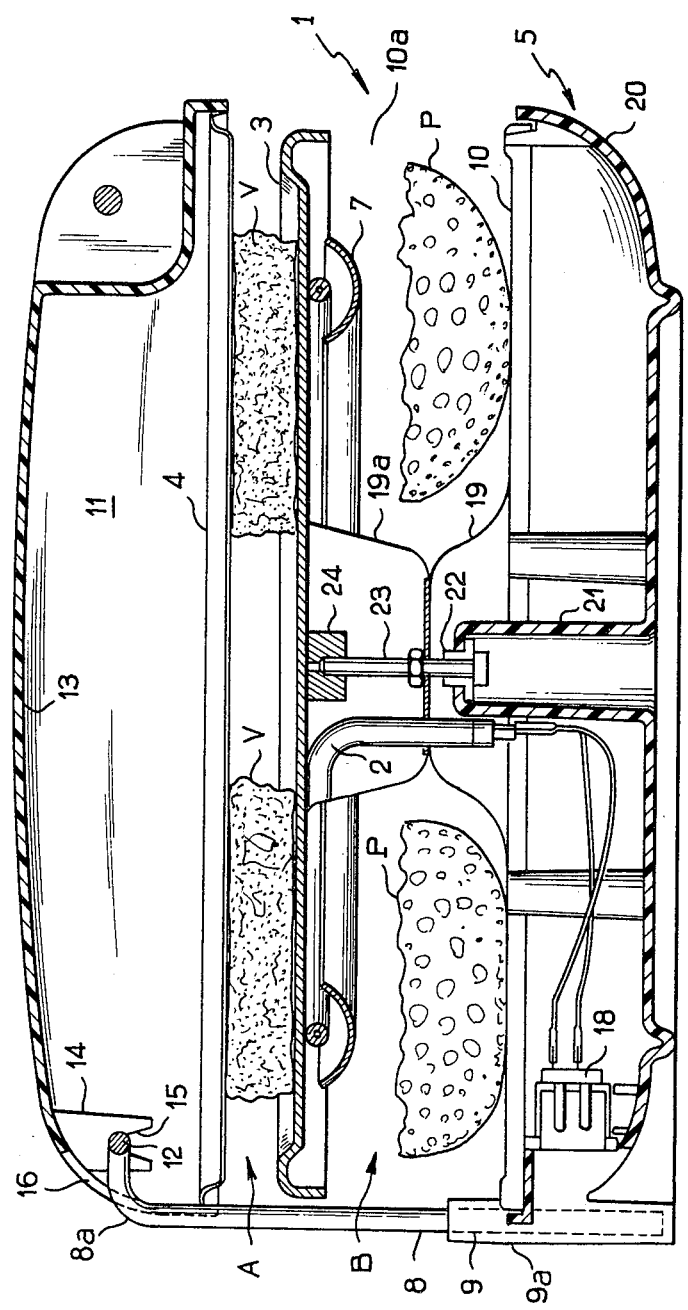
FIG. 2 is a longitudinal sectional view in elevation showing the preceding embodiment in which the first heating enclosure is located above the second heating enclosure.

The culinary appliance illustrated in FIGS. 1 and 2 is intended to prepare the constituents of a number of sandwiches of the so-called "hamburger" type by cooking at least one portion of meat, especially a portion of hashed meat, and by heating the bread.

Said appliance 1 comprises a cooking plate or so-called hotplate 3 beneath which is placed a heating resistor 2. There are shown on said hotplate 3 two portions of hashed meat (V) to be cooked. Provision is made above the hotplate 3 for a pressure member 4 which is intended to apply pressure on the portion of meat (V) after this latter has been placed on the hotplate 3. Said pressure member determines with said hotplate a first heating enclosure A.

A base 5 (described hereinafter) supports the resistor 2, the hotplate 3 and the pressure member 4 by means of a spacer member 19, 19a in a manner which will be described in detail below.

The spacer member 19, 19a determines a gap of invariable height between the top face of the base 5 and the underface of the hotplate 3. This accordingly provides a continuously available space which is sufficient to place therein portions of bread P (or "half-rolls") which are thus located within a second heating enclosure B of the appliance. Said second heating enclosure B communicates with the exterior via an opening 10a which extends around the periphery of the appliance (as shown in FIG. 1) and permits easy positioning and withdrawal of pieces of bread. Between said enclosure B and the heating resistor 2 located beneath the hotplate, there extends a metallic wall 7 formed by a sheet-metal member placed beneath the resistor in order to constitute on the one hand a reflector for returning part of the heat radiation of the resistor 2 towards the hotplate 3 and, on the other hand, a heat source having low radiation density for transmitting to the second enclosure B and distributing within this latter the energy which has not been reflected towards the hotplate 3. Thus the half-rolls of bread P are subjected to attenuated and uniformly distributed heating which does not give rise to charring of the bread.

In the embodiment shown in the drawings, the sheet-metal member 7 constituting the metallic wall is cut to a shape corresponding to the outline of the heating resistor 2 and is arranged beneath said resistor in such a manner as to ensure that substantially the entire active portion of this latter extends over said sheet-metal member 7. The resistor preferably has a practically circular outline but other shapes (such as a sinuous or wavy shape, for example) may be contemplated.

In the alternative embodiment shown in FIGS. 1 and 2, the pressure member 4 is constituted by the underface of a lid in the form of a compartment 11 which is pivotally mounted on hinge-pins 12 formed on two columns 8 slidably mounted within the base 5.

In the example illustrated, the pivotally mounted assembly is designed as follows: at least one lug 14 is formed on the internal face of the top wall 13 of the compartment-type lid 11. Said lug is provided with a V-shaped recess or groove 15. An elongated slot 16 is formed in the side wall of the lid. The hinge-pin 12 formed on each column 8 is so arranged as to pass through said slot into the interior of the lid 11 in order to engage within the recess or groove 15, thus constituting a hinge joint which accordingly connects the pressure member 4 to the base 5 by means of the top wall 13 and the lug 14. The pressure member 4 consisting of a plate of aluminum coated with polytetrafluoroethylene (PTFE) is maintained within the rim of the lid 11 by means known per se such as clamping or crimping, for example. The wall 13 of the lid 11 is advantageously of thermoplastic material.

The columns 8 can consist very simply of steel rods, each rod being provided with a first right-angled elbow in the vicinity of its top portion at 8a and being also provided with a second right-angled elbow in order to form the hinge-pin 12 which extends in a direction perpendicular to the plane of the first elbow. The lower portion of each column 8 is slidably engaged within a socket 9 formed in the base 5.

Said base 5 is a casing provided with a connector 18 for the supply of electric current to the heating resistor 2. The top face 10 of said base 5 is a sheet-metal member and advantageously consists of a burnished chrome steel plate or burnished stainless steel plate which constitutes a flat support for the portions of bread P.

Said base 5 in the form of a casing comprises a dished base plate 20 of thermoplastic material, the bottom wall of which is provided with a tubular central column 21 having its opening on the underface of said bottom wall and closed at the top by means of a shouldered washer 22. The sheet-metal plate 10 is provided at its center with a cup-shaped protuberance 19 having an upwardly-directed end wall. A second cup-shaped protuberance 19a having a downwardly-directed end wall and placed against the protuberance 19 is adapted to support the hotplate 3 and may if necessary be joined to this latter by welding, for example. The two protuberances 19, 19a can be joined together by welding and can thus finally constitute a single spacer member 19–19a. A screw 23 introduced through the bottom opening of the central column 21 is engaged within the shouldered washer 22 and passed through the cup-shaped protuberances in order to be engaged in a nut 24 which is welded to the center of the underface of the hotplate 3. As can be seen in FIG. 1, the socket 9 for receiving the column 8 which serves to connect the base 5 to the pressure member 4 is formed in a portion 9a of tubular shape which is molded in one piece with the dished base plate 20 of thermoplastic material.

The appliance described in the foregoing operates as follows: it is first switched-on in order to preheat the hotplate 3 over a period of a few minutes. The portions of meat V are then placed on the hotplate 3 and the lid is turned-down to its closed position. Without waiting further, the half-rolls of bread P are placed in position with the crumb portion facing upwards or downwards against the plate 10. Since the reflector 7 is heated by the radiation of the electric resistor 2, said reflector in turn radiates towards the half-rolls of bread P, thus subjecting these latter to low-temperature heating without toasting the crumb surface.

When the first face of the portions of meat have been cooked, these latter are turned over.

Within an interval of four to five minutes, the hashed steak portions are done to a turn and the half-rolls of bread are reheated to a suitable temperature. The bread-roll halves can then be withdrawn and the lid can be raised in order to take out the hashed-meat portions and to prepare sandwiches of the "hamburger" type.

FIG. 3 illustrates an alternative embodiment of the invention in which the second enclosure B, or in other words the bread-heating enclosure, is located above the first heating enclosure A which is intended to receive the meat.

The elements corresponding to those of the embodiment described earlier are given the same references. They will be described in detail only insofar as they exhibit novel characteristics with respect to the form of construction which has already been described.

In the alternative embodiment shown in FIG. 3, in which the second heating enclosure B is located above the first heating enclosure A, two metallic walls extend between the heating resistor and the second heating enclosure B. One metallic wall is constituted by the hotplate 3. The other metallic wall consists of a grid or perforated sheet 4' which constitutes both the flat surface of the pressure member and the bottom wall of the second heating enclosure B.

The top wall of the second heating enclosure B is a cover which is advantageously of molded thermoplastic material and pivotally mounted on at least one hinge-pin 12 formed on at least one column 8 slidably mounted in the base 5. The pressure member 4 is pivotally mounted on the same hinge-pin. As in the preceding example, the heating resistor 2 is located beneath and in close proximity to the hotplate 3 but is preferably in contact with this latter.

Consideration being given to FIG. 3, it is apparent that in this embodiment, the pressure member 4 is directly hinged on the pin 12 formed on the column 8. Said pressure member 4 is preferably constituted by a grid formed by a perforated plate consisting advantageously of a plate of microperforated aluminum coated with PTFE.

The top wall of the second heating enclosure B as constituted by a cover 17 of thermoplastic material is provided internally (in the same manner as the lid of the preceding embodiment) with at least one portion having a V-shaped recess or groove which is placed astride the hinge-pin 12 formed on the column 8. Said hinge-pin is adapted to penetrate beneath the cover 17 through an elongated slot 16 formed in the side wall of said cover. The length of said slot is such that the cover can be raised to a vertical position in the same manner as a hinged lid.

In this example, the top face of the base 5 is constituted by a sheet-metal plate 10 (preferably a burnished chrome steel plate or a burnished stainless steel plate constituting a reflector for thermal radiation emitted by the heating resistor 2) and has raised edges in the shape of a cup.

There is again shown in FIG. 3 a protuberance 19 which is identical with the protuberance illustrated in FIGS. 1 and 2. In this embodiment, the protuberance 19 has only one cup-shaped portion since the hotplate 3 can be placed in closer proximity to the base. The reason for this is that there is no need to provide a space in order to form the second heating enclosure B since this latter is now located above the first heating enclosure A.

In this alternative embodiment, the second heating enclosure B is a space having closed sides with the exception of the elongated slot 16 through which are passed the means for connecting the cover to the base (namely the column 8 which carries the hinge-pin 12).

The pressure member constituted by the grid 4 is provided with its own gripping means consisting of a projecting portion 4a of the grid 4, thus making it possible to raise the cover 17 and the grid 4 at the same time and in the same manner as a single-unit lid. In order to place the portions of bread in position after having positioned the portions of meat, the cover 17 is provided with its own gripping means 17a whereby said cover can be lifted independently.

In regard to all the other features, this form of construction corresponds to the embodiment shown in FIGS. 1 and 2.

The appliance illustrated in FIG. 3 is employed as follows:

When the portions of meat V have been placed on the hotplate 3, the grid 4 is swung down to its horizontal position. The half-rolls of bread P are then placed on the grid so that the crumb side of each half-roll rests on said grid 4. The cover 17 is then swung down to its closed position. When the first face of the meat portions V is cooked, the composite lid consisting of grid 4 and cover 17 is raised to its open position, this manual operation being performed by means of the gripping member 4a. The portions of meat are turned over, whereupon the assembly 4, 17 is returned to its closed position. While cooking is in progress, the half-portions of bread rolls are subjected to the heat radiation of the hotplate 3 and to the convection currents produced by this latter. By virtue of the perforations of the grid 4, said half-rolls are also in contact with the cooked faces of the portions of meat V. When said meat portions have been cooked, the half-rolls of bread have attained the appropriate temperature without being toasted. They are then impregnated with the steam and emanations produced during cooking of the meat, which could not be achieved by means of known appliances of the prior art.

The forms of construction presented in the figures are not intended to imply any limitation. Many variants of the means employed may accordingly be contemplated by anyone versed in the art in regard to the constructional details of an appliance designed in accordance with the invention and as described in the foregoing.

The shape of the appliance when looking from above can be as desired, namely square with rounded corners, circular, oval, polygonal, and so on. Again when seen from above, the contour of the hotplate and of the pressure member is similar to that of the casing and of the lid or cover. It is therefore apparent that the terms "center" and "central" used by way of example to describe the position of the column 21 are intended to refer not to the center of a shape which is necessarily circular but to the center of gravity of the hotplate.

Finally, it is self-evident that the heating resistor 2 may just as easily consist of a series of elementary resistors arranged at intervals beneath the hotplate 3. The single heating resistor referred-to throughout the foregoing description should accordingly be understood to extend in a general sense to electric resistance-type heating means which produce a suitable temperature for cooking meat.

It is readily apparent that the heating enclosure B for pieces of bread could be equipped with an additional heating resistor. In this case, the plate 4 of the embodiment of FIG. 3 need not be perforated.

Moreover, the heating enclosures A and B could be juxtaposed parallel to a vertical plane and not superposed as in the case of the examples hereinabove described.

What is claimed is:

1. A culinary appliance for preparing constituents of sandwiches of the type known as "hamburgers" by cooking at least one portion of meat and especially a portion of hashed meat and by heating bread, said appliance being constituted by:
   a heating resistor having an active portion;
   a hotplate having an underface placed above said resistor and intended to receive at least one portion of meat to be cooked;
   a pressure member which is intended to be applied against the portion of meat placed on the hotplate and which determines with said hotplate a first heating enclosure in which said portion of meat is located;
   a second heating enclosure having a bottom surface for receiving at least one piece of bread to be heated;
   a base for supporting the heating resistor, the hotplate and the pressure member, said base having a top face;
   wherein said first heating enclosure and said second heating enclosure are juxtaposed and heated simultaneously by said heating resistor, at least one metallic wall being placed between said second heating enclosure and said resistor in order to limit the heating temperature within said second enclosure to the value required for the piece of bread.

2. A culinary appliance according to claim 1, wherein said pressure member is a lid which has a flat surface.

3. A culinary appliance according to claim 2, wherein the pressure member is connected to the base by means of a hinge joint and a sliding joint for modifying the distance between said pressure member and the hotplate and for adapting the height of the first heating enclosure to the thickness of the portion of meat.

4. An appliance according to claim 3, wherein the second heating enclosure is located beneath the first heating enclosure and the top face of the base delimits the bottom surface of said second heating enclosure.

5. An appliance according to claim 4, wherein the second heating enclosure communicates with the exterior via an opening which extends along the periphery of said appliance and permits positioning and withdrawal of pieces of bread.

6. An appliance according to claim 4, wherein the heating resistor is of the sheathed tubular type and located in the immediate vicinity of the underface of the hotplate, the metallic wall placed between the second heating enclosure and the heating resistor being constituted by a sheet-metal member placed beneath said resistor in order to provide on the one hand a thermal reflector for returning part of the radiation produced by said resistor to said hotplate and, on the other hand, a heat source having low radiation density for transmitting to the second enclosure and distributing within said enclosure the energy which has not been reflected towards said hotplate.

7. A culinary appliance according to claim 6, wherein the pressure member is the underface of a compartment-type lid pivotally mounted on at least one hinge-pin formed on at least one column which is slidably mounted in the base.

8. A culinary appliance according to claim 6, wherein the sheet-metal member constituting the metallic wall aforesaid is cut to a shape corresponding to the outline of the heating resistor and placed beneath said resistor in order to ensure that the active portion of said resistor extends substantially over the entire sheet-metal member.

9. A culinary appliance according to claim 1, wherein the heating resistor is located beneath and in close proximity to the hotplate, two metallic walls are provided between said heating resistor and the second heating enclosure, said second heating enclosure is located above the first heating enclosure, the two metallic walls aforesaid are constituted in one case by said hotplate and in the other case by a grid or a perforated sheet-metal member which constitutes both the flat surface of the pressure member and the bottom wall of the second heating enclosure, the top wall of said second heating enclosure is a cover pivotally mounted on at least one hinge-pin formed by at least one column which is slidably mounted on or in the base, said pressure member being pivotally mounted on said hinge-pin.

10. A culinary appliance according to claim 9, wherein the base is a casing equipped with a connector for supplying current to the heating resistor, and the top face of said base is a sheet-metal member for supporting the hotplate by means of at least one spacer member.

11. A culinary appliance according to claim 10, wherein the sheet-metal member which constitutes the top face of the base is provided with raised edges having the shape of a cup and constitutes a reflector.

* * * * *